April 17, 1945.  J. FERLA  2,374,087
APPARATUS AND PROCESS FOR MAKING PIPES
Filed Nov. 20, 1940  2 Sheets-Sheet 1
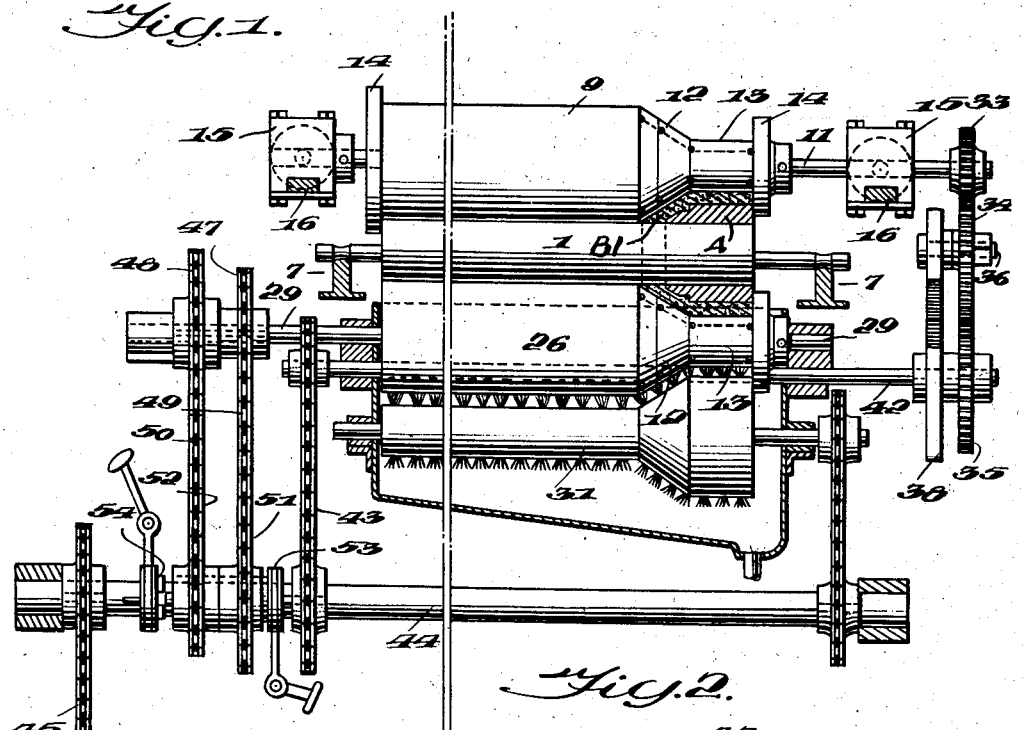
Inventor
John Ferla
By J. Ruston Swecker
his Attorney April 17, 1945.                J. FERLA                   2,374,087
               APPARATUS AND PROCESS FOR MAKING PIPES
                       Filed Nov. 20, 1940            2 Sheets-Sheet 2
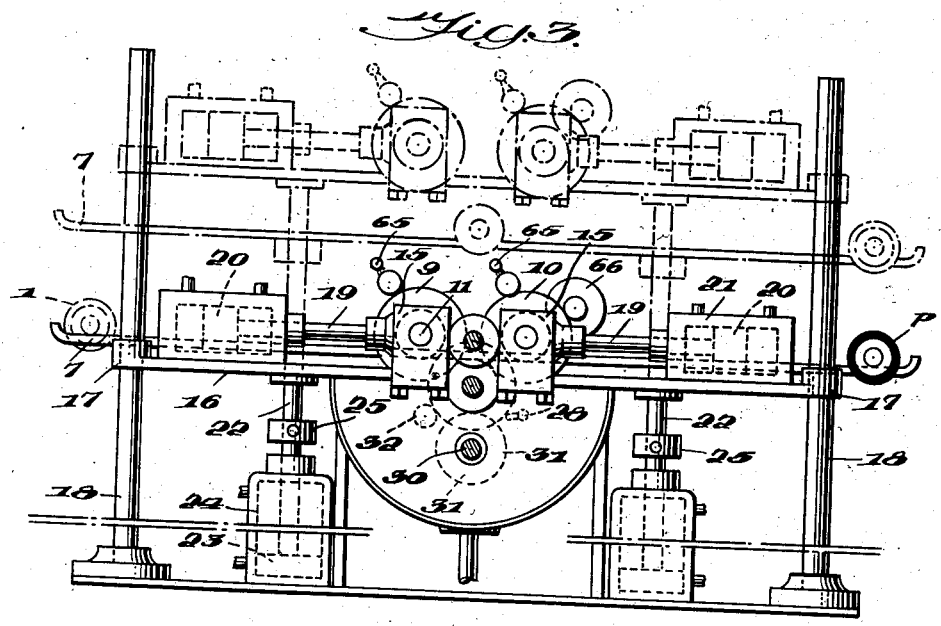
Inventor
John Ferla
By J. Preston Swecker
his Attorney Patented Apr. 17, 1945

2,374,087

UNITED STATES PATENT OFFICE 2,374,087

APPARATUS AND PROCESS FOR MAKING PIPES

John Ferla, Camden, N. J., assignor to U. S. Asbestos Cement Pipe Company, Camden, N. J., a corporation of New Jersey Application November 20, 1940, Serial No. 366,479

16 Claims. (Cl. 25—30)

This invention relates to an improvement in a method of and apparatus for producing pipes, and is an improvement on the pipe producing systems set forth in my prior patent on Method of producing fibrous cementitious tubes, No. 2,177,643, granted October 31, 1939, and on my applications for Apparatus for producing pipes, Ser. No. 247,507, filed December 23, 1938, and now Patent No. 2,283,921, granted May 26, 1942, and for Machine for producing pipes, Ser. No. 284,987, filed July 17, 1939, now Patent No. 2,364,061, granted December 5, 1944.

My prior patent and applications, above-mentioned, disclosed the production of pipes or tubes formed of asbestos cement material, in which a bell collar was formed on the pipe, as an integral part thereof during the formation of the pipe for interfitting connection with a companion pipe. In the formation of such a bell collar, the asbestos cement material thereof was formed of approximately the same thickness and strength as the barrel of the pipe, and while it would withstand as much pressure as the barrel of the pipe, it is often desirable or required that the bell be capable of withstanding appreciably greater pressure than the barrel of the pipe.

The object of this invention is to improve the manner of forming the pipes, whereby a bell collar will be formed on each pipe as it is produced, which will withstand appreciably greater pressure than the barrel of the pipe, preferably by the formation of the bell of greater thickness than the barrel, with capability of varying the thickness of the bell according to the relative pressures desired in the respective portions of the pipe.

This relatively greater thickness of the bell is formed preferably by pre-forming an inner wall portion of the bell about which portion the outer portion of the bell is formed during the formation of the barrel of the pipe. The thickness of the bell may be varied relative to the barrel by varying the thickness of the pre-formed portion thereof, so as to provide the desired relative strength of the bell as may be required, according to the thickness of the wall thereof.

Another object of the invention is to improve the character of the formed pipes, so as to provide a pipe having a body portion constructed of asbestos cement material, while one or both of the outside and inside surfaces thereof may be formed of smooth binding or cementitious material to impart the desired smooth appearance to the pipe, or the pipe may be reinforced by the incorporation of reinforcing material between successive layers thereof.

The invention is shown in a preferred embodiment thereof, together with a modification, in the accompanying drawings, in which:

Fig. 1 is a vertical sectional view through the apparatus;

Fig. 2 is a detail end view of a portion thereof showing the driving mechanism;

Fig. 3 is an end elevation from the opposite end of the machine, with parts in section and parts omitted for clearness;

Fig. 4 is a similar view of the hopper structure;

Fig. 5 is a quarter section of the mandrel with a formed pipe thereon;

Fig. 6 is a similar view of the mandrel with its collar;

Fig. 7 is a side elevation of a conic sleeve for a calender roll;

Fig. 8 is a similar view of a cylindrical sleeve therefor;

Fig. 9 is a longitudinal section through a preformed bell portion on its collar;

Fig. 10 is a longitudinal section through a reinforced pipe on a mandrel with said mandrel in elevation; and Fig. 11 is a transverse section therethrough on the line 11—11 of Fig. 10.

The machine shown generally in Figs. 1 and 3 is adapted for operation and use in the manner set forth somewhat in my prior application on Apparatus for producing pipes, Ser. No. 247,507, now Patent No. 2,283,921, inasmuch as the pipe is formed on a mandrel in co-operation with calender rolls adapted for coaction therewith.

The mandrel is designated generally by the numeral 1 and may be constructed either of one piece, or, as shown in Fig. 5, of a core 2 surrounded by a shell 3 which is removable from the core to permit reuse of the latter during the finishing and drying of the formed pipe on the shell as set forth in my application, Ser. No. 247,507, now Patent No. 2,283,921.

Surrounding the mandrel 1 at one end thereof is a collar 4 removably sleeved over the external surface of the mandrel and preferably formed of metal to retain the shape thereof. This collar has a reduced end 5 as shown in Figs. 1, 5 and 9, and is constructed to shape the inside of the bell collar on the pipe to be formed while the reduced end 5 forms a shoulder therein to receive and abut the end of an adjacent pipe. The thickness of the wall of the collar 4 may be varied according to the desired inner diameter of the bell. The collar 4 preferably has a section B1 molded or otherwise formed thereon when said collar is removed from the mandrel 1, as shown in Fig. 9, after which the collar 4 with its pre-formed bell section B1 is slipped over the end of the mandrel, but preparatory to receiving the material thereon to form the pipe, as shown in Fig. 5. The body portion of the pipe is designated P therein and constitutes the barrel thereof, at one end of which an enlarged bell portion B is shown.

The opposite ends of the mandrel 1 are constructed with trunnions 6 adapted to support the mandrel and for rolling the same into and out of the machine, which trunnions are supported on tracks 7, extending transversely of the machine as shown in Fig. 3.

The mandrel 1 may be provided with flanges 8 secured on the trunnions 6 at opposite ends thereof, if desired, to confine the opposite ends of the formed pipe and to prevent the loss of material therefrom.

A pair of calender rolls designated generally by the numerals 9 and 10 are arranged in spaced relation as shown in Fig. 3, adapted to receive the mandrel 1 therebetween, which calender rolls correspond substantially in their manner of adjustment and operation with those set forth in my prior application, Ser. No. 247,507, now Patent No. 2,283,921. Each of the calender rolls 9 and 10 is formed of a cylindrical body portion mounted on a shaft 11, at one end of which body portion are journalled one or more conical sleeves 12 (Fig. 7) and a cylindrical sleeve 13 (Fig. 8) which are journaled for turning movement relative to each other and relative to the body portion with suitable packing therebetween as set forth in my application, Ser. No. 284,987, now Patent No. 2,364,061. The opposite ends of each calender roll should be provided with collars 14 thereon to confine the material therebetween if collars are not provided on the mandrel.

The mandrel 1 and the barrel portion of the pipe formed thereon are rotated by the contact therewith of the calender rolls 9 and 10, while the sleeves 12 and 13 are rotated by the collar 4 and bell portion B1 bearing thereagainst. The speed of rotation of these parts may be varied with changes in pipe diameter as well as with variations in thickness of the barrel and bell of the pipe.

The shafts 11 are journaled in bearing blocks 15 slidably mounted on guideways 16, extending transversely of the shafts, as shown in Fig. 3, and having guides 17 on opposite ends thereof slidably mounted on standards 18 extending upwardly in parallel relation at each end of the machine.

Connected with each bearing block 15 and extending outwardly therefrom is a piston rod 19 attached to a piston 20 in a cylinder 21, which piston and cylinder constitute a hydraulic power device adapted for moving its connected bearing block 15 on the guideway 16. Such hydraulic power devices are arranged in opposed relation at each end of the machine and are adapted for joint inward and outward movement of the bearing blocks 15 in moving the associated calender rolls 9 and 10 toward or from the mandrel mounted therebetween.

The guideways 16 are supported on connecting rods 22 extending downwardly to pistons 23 in cylinders 24, which pistons and cylinders 23 and 24 constitute hydraulic power devices arranged in pairs at opposite ends of the machine for supporting the respective guideways 16, and are adapted to receive fluid power under the same hydraulic pressure as the cylinders 21, sufficient to raise the parts to elevated positions when desired. The connecting rods 22 have fixed thereon abutments 25 constructed for engaging the trackways 7 after predetermined upward movement of the pistons 23, to move said trackways to elevated positions, as indicated in dotted lines in Fig. 3. These power devices 23—24 serve also to hold the power devices 20—21 in such positions as to maintain the desired pressure of the calender rolls 9 and 10 with their sleeves 12 and 13 on the mandrel and the formed pipe thereon.

Mounted beneath the calender rolls 9 and 10 in position to be disposed therebetween and to support the mandrel thereon, is a third calender roll 26, shown in Figs. 1, 3 and 4, and preferably constructed substantially the same as the calender rolls 9 and 10, but shown as having a fabric covering 27 of suitable absorbent material, as shown in Fig. 4, although the calender roll instead may be constructed with circumferential grooves if desired to receive moisture from a spray 28 for washing excess material from the fabric covering or periphery of the calender roll. The calender roll 26 is mounted on a shaft 29, beneath which is a shaft 30, carrying a rotating brush 31 for removing particles of material from the periphery of the calender roll 26. A wringer 32 bears against the periphery of the calender roll 26 to remove excess moisture therefrom, as described in my application, Ser. No. 284,987, now Patent No. 2,364,061.

The calender rolls 9, 10 and 26 are adapted to be power driven, as shown in Figs. 1 and 2, for which purpose the shafts 11 carry gears 33, fixed thereon and each meshing with an idle gear 34, which idle gears 34 are driven jointly by a main gear 35. The idle gears 34 are journaled on stub shafts 36 mounted in slots 37 in a bearing support 38, capable of inward and outward movement relative to each other, while the gear 35 is mounted on a stub shaft 39 adjustably mounted in a slot 40 in said bearing support for vertical adjustment relative thereto. These adjustments may be necessary to accommodate for gears of different sizes that may be substituted on the different shafts to provide for the proper and desired relative speeds thereof. The gear 35 is driven by a pinion 41 mounted on a shaft 42 connected by sprocket gearing 43 with a drive shaft 44. Said drive shaft 44 is driven by sprocket gearing 45 from a power unit 46 preferably comprising speed reducing gearing and motor.

The shaft 29 carrying the calender roll 26 has a pair of sprockets 47 and 48 keyed thereon and connected respectively by sprocket chains 49 and 50 with sprocket wheels 51 and 52 journaled for free rotation relative to the shaft 44. The sprocket wheels 51 and 52 are adapted to be connected alternately with the shaft 44 by clutches 53 and 54, whereby one or the other of the sprocket wheels 51 and 52 will be driven by the shaft 44 for rotating the shaft 29, driving the lower calender roll 26 at a speed depending upon which of the sprocket wheels 51 and 52 is connected with the drive shaft 44. Normally, the clutch 53 would be closed to drive the calender roll 26 through the sprocket wheel 51, chain 49 and sprocket wheel 47, so as to impart to the lower calender roll 26, the same speed of rotation as that at which the calender rolls 9 and 10 are driven through the gearing shown in Fig.

2, but after the complete formation of the pipe on the mandrel, the clutch 53 is disconnected and the clutch 54 connected to drive the lower calender roll at a slower speed than the calender rolls 9 and 10 to release the formed pipe from the mandrel.

The material used in forming the pipes is supplied from main hoppers 55 to secondary hoppers 56 which extend throughout the length of the calender rolls and have agitators or disturbers 57 therein, as well as distributing brushes 58. From the lower ends of the hoppers 56, extend nozzles 59 which are connected therewith for relative sliding and oscillating movement. The lower ends of the nozzles 59 are connected with supports 60 attached to the bearing blocks 15, whereby outward or vertical movement of said bearing blocks will cause corresponding movement of the nozzles 59 to maintain the lower ends of the nozzles directly over the calender rolls 9 and 10.

Suspended between the supports 60 is a bridging support 61 connected with each of the supports 60 by bolt and slot connections 62 permitting lateral sliding movement of the supports 60 relative thereto. The bridging support 61 carries a nozzle 63 extending downward from a hopper 64 adapted to contain finishing material, such as cement. The nozzle 63 is capable of vertical movement relative to the hopper 64 upon the raising or lowering movements of the rolls 9 and 10 but remains in a central position when said rolls are adjusted outward relative to each other.

In the formation of pipes in the apparatus described, the bell portion B1 is formed initially on the collar 4 by molding in any suitable way, after which the collar is applied to one end of the mandrel 1, as shown in Figs. 1 and 5, and the mandrel is inserted between the calender rolls 9 and 10, as shown in Fig. 3.

Then upon the operation of the calender rolls 9 and 10, these are initially moistened from sprays 65, and the asbestos cement or other composition or material from which the pipes are to be formed, is supplied through the nozzles 59 onto the moistened surfaces of the calender rolls 9 and 10, and transferred therefrom onto the mandrel 1, being pressed thereon also by the calender roll 28. This builds up a pipe of the desired thickness on the mandrel as additional material is supplied thereto, throughout the length of the mandrel including the bell portion thereof forming both the barrel P and the bell B simultaneously, but the latter is superposed on the pre-formed bell portion B1, so as to produce a composite bell of appreciably greater thickness than the barrel P, providing for a materially greater strength therein as desired. The calender roll 10 has a packing roller 66 operating to form a layer on the calender roll for transfer to the mandrel, whereby the loss of material will be prevented in passing around the outside of the calender roll.

After the pipe has been formed of the desired thickness, the operator disconnects the clutch 53 and closes the clutch 54 to operate the lower calender roll 26 at slower speed than the calender rolls 9 and 10 which thereby tends to separate the formed pipe from the mandrel.

When the formation of the pipe is completed, the operator retracts the calender rolls 9 and 10 by the power devices 20—21, and operates the power devices 23—24 to lift the assembly including the formed pipe on the mandrel substantially to the dotted line position shown in Fig. 3, which also raises the calender rolls from contact with the pipe leaving the latter free to be rolled along the trackways 7 to the discharge sides of the machine while an empty mandrel 1 is brought in at the opposite side thereof, into position to overlie the calender roll 26 between the calender rolls 9 and 10. Then the parts are moved back to their full line positions in Fig. 3 and the forming operation is repeated.

The hopper 64 preferably contains a quantity of cement or smooth forming material which may be used to impart a smooth layer to the inside or outside or both of the pipe, as by supplying a layer of the cement or other suitable material from the hopper 64 directly to the periphery of the mandrel before the supply is started from the hoppers 56 and then at the completion of the forming of the pipe after the supply of asbestos cement material is discontinued, an additional layer may then be supplied from the hopper 64 to provide a smooth surface to the pipe.

Figs. 10 and 11 show the manner of forming a reinforced asbestos cement pipe in which a mandrel 71 has several layers of composition material applied thereto as indicated at 72, after which a band of reinforcing material 73 is applied therearound, which may be formed in any suitable manner, such as by wire mesh, basket shape, or the like, and this is then covered by additional layers of asbestos cement material as shown at 74. When the layers 72 and 74 are compacted, the reinforcing material will be embedded therein and will strengthen and reinforce the walls of the pipe.

I claim:

1. A method of producing a pipe on a mandrel comprising applying a pre-formed bell portion to said mandrel and forming a layer of cementitious material around said mandrel and the pre-formed bell portion to form a pipe on the mandrel with a bell of greater thickness than the remainder of the pipe.

2. A method of producing a pipe on a mandrel comprising applying a pre-formed bell portion to the mandrel, thereafter rotating the mandrel and applying asbestos cement material thereto and to the pre-formed bell portion, whereby the composite bell is of greater thickness than the remainder of the pipe formed on the mandrel.

3. A process of producing a pipe on a mandrel comprising the steps of producing a pre-formed bell portion on a collar, applying said collar to the mandrel, thereafter rotating the mandrel with the pre-formed bell portion thereon, applying a layer or layers of asbestos cement material to said mandrel and simultaneously to the pre-formed bell portion producing a pipe on the mandrel having a composite bell of greater thickness than the remainder of the pipe.

4. A process of producing a pipe comprising applying a layer or layers of cementitious material to a mandrel, calendering the material on the mandrel by rotary pressure thereagainst at uniform speed at a plurality of different points therearound, and thereafter reducing the speed at one of said points relative to the speed of calendering action at another point to loosen the pipe on the mandrel.

5. In an apparatus for producing a pipe, the combination of a mandrel of uniform cylindrical surface from end to end thereof, a collar removably telescoped over an end of the mandrel and adapted to support a preformed bell portion thereon, means for applying a layer or layers of asbestos cement material to the periphery of the mandrel and the periphery of the bell portion, a plurality of calender rolls bearing against the material applied thereto at a plurality of spaced circumferential points, means for driving said calender rolls at uniform circumferential speeds, and means for disconnecting one of the calender rolls from the driving means and driving the same at slower circumferential speed than the remaining calender rolls.

6. In an apparatus for producing a pipe, the combination of a plurality of calender rolls adapted to act respectively on a mandrel therebetween, means for driving the calender rolls at uniform circumferential speed, and means for disconnecting one of the calender rolls from the driving means and for driving the same at lower circumferential speed than the remaining rolls for loosening a formed pipe on the mandrel.

7. In an apparatus for producing a pipe, the combination of a calender roll adapted to cooperate with a mandrel, means for moistening said calender roll, means for applying a layer of cementitious material to the moistened surface of the calender roll, and a pressing roll in position to bear against the periphery of the calender roll to press the moistened layer thereon for transfer therefrom to the mandrel.

8. In an apparatus for producing a pipe, the combination of a pair of calender rolls adapted to receive a mandrel therebetween, means mounting said calender rolls for bodily movement toward and from each other, a pair of hoppers having discharge spouts connected therewith for lateral swinging movement relative thereto, means connecting the spouts with the calender mounting means to hold the spouts in position for discharge on the calenders in different lateral positions thereof, a hopper mounted between the first-mentioned hoppers and having a discharge spout in position to direct material onto the mandrel, supporting means for the last-mentioned spout, and means connecting said supporting means with the connecting means of the first-mentioned spouts for movement of the first-mentioned spouts relative to the intermediate spout.

9. In an apparatus for producing pipe, the combination of a calender roll mounted for rotary movement about an approximately horizontal axis in position to receive a mandrel thereon, a pair of calender rolls mounted for rotary movement about axes approximately parallel with the first-mentioned axis and on opposite sides thereof above said first-mentioned axis in position to bear against opposite sides of said mandrel approximately in alignment with the axis thereof, means for applying pressure in opposed directions against the pair of calender rolls, and means for raising and lowering said pair of calender rolls and the pressure applying means thereof relative to the first-mentioned calender roll and the mandrel thereon.

10. A process of producing a pipe on a mandrel comprising forming a layer of cementitious material on said mandrel, and simultaneously with the forming of said layer permanently attaching a pre-formed bell portion to an end thereof to provide a bell on said pipe.

11. A process of producing a pipe on a mandrel comprising mounting a pre-formed bell portion in fixed portion relative to the mandrel, and forming a layer of cementitious material on the mandrel and on the pre-formed bell portion to form a pipe on the mandrel with a bell collar thereon.

12. A process of producing a pipe on a mandrel comprising mounting a pre-formed bell portion in fixed portion relative to the mandrel, and forming a layer of cementitious material on the mandrel and on the pre-formed bell portion to form a pipe on the mandrel with a bell collar thereon of greater thickness than the remainder of the pipe.

13. A process of producing a pipe comprising applying a layer or layers of cementitious material to a mandrel, calendering the material on the mandrel by applying rotary pressure thereagainst at uniform speed at a plurality of different points therearound, and thereafter applying rotary pressure to said material on the mandrel at a different speed at one of said points than the speed of the rotary pressure applied at another of said points to loosen the material on the mandrel.

14. In an apparatus for producing pipe, the combination of a roll mounted for turning movement about an approximately horizontal axis in position to receive a mandrel thereon, a pair of calender rolls mounted for turning movement about axes approximately parallel with the first-mentioned axis in position to bear against substantially opposite sides of said mandrel, and hydraulic means for applying pressure on the calender rolls substantially in opposed directions against approximately opposite sides of the mandrel and for raising and lowering the calender rolls relative to the first-mentioned roll and the mandrel.

15. A process of producing a pipe comprising shaping a partial bell portion, forming a tube of cementitious material, and simultaneously with the formation of the tube applying a coating of said cementitious material integral with said tube to a surface of the partial bell portion thereby permanently attaching said shaped partial bell portion to an end of the tube to provide a bell thereon.

16. A process of producing a pipe on a mandrel comprising shaping a partial bell portion of cementitious material, forming a tube of cementitious material on said mandrel, and simultaneously with the formation of the tube applying a coating of said cementitious material integral with said tube to a surface of the partial bell portion thereby permanently attaching said shaped partial bell portion to an end of the tube to provide a bell thereon.

JOHN FERLA.